(No Model.)
S. Q. BARLOW.
FARM GATE.
No. 289,800.
Patented Dec. 11, 1883.
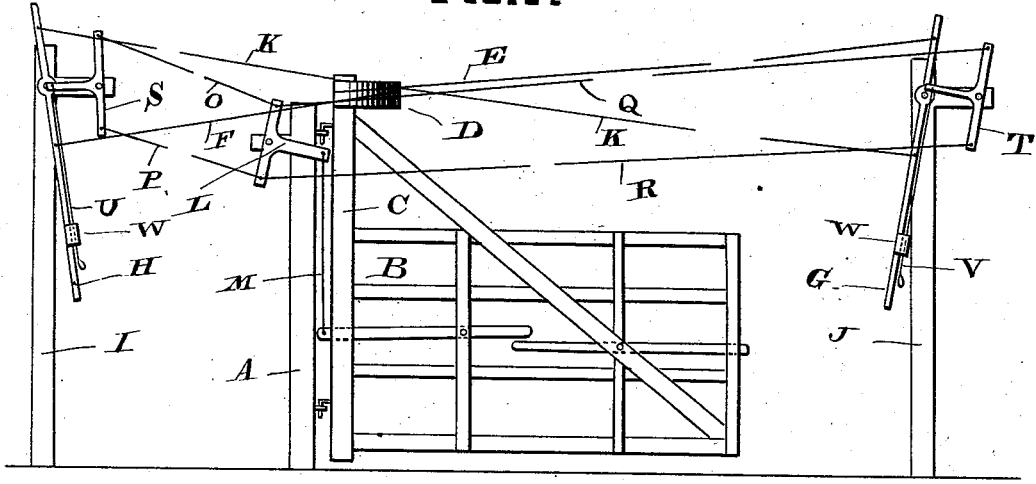
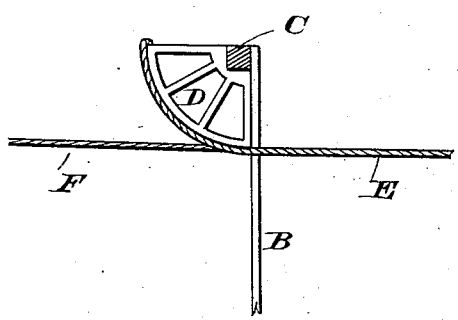
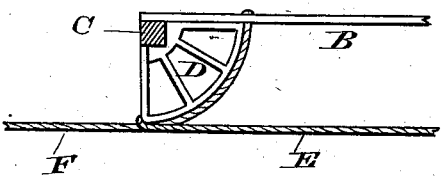
WITNESSES.
Wilmer Bradford
Edwin Derby
INVENTOR
Solomon Q. Barlow
By C. W. M. Smith
Attorney.
N. PETERS. Photo-Lithographer. Washington. D. C.

UNITED STATES PATENT OFFICE.

SOLOMON Q. BARLOW, OF PETALUMA, CALIFORNIA.

FARM-GATE.

SPECIFICATION forming part of Letters Patent No. 289,800, dated December 11, 1883.

Application filed May 31, 1883. (No model.)

*To all whom it may concern:*

Be it known that I, SOLOMON Q. BARLOW, a citizen of the United States, and residing at Petaluma, in the county of Sonoma and State of California, have invented certain new and useful Improvements in Farm-Gates, of which the following is a specification.

My invention relates to improvements in farm-gates; and the object of my invention is to provide a farm-gate with a system of levers and connecting rods or wires, by means of which the latch may be raised and the gate opened and closed by equestrians or persons in vehicles without the necessity of dismounting. This object I accomplish by means of the mechanism illustrated in the accompanying drawings, in which—

Figure 1 is an elevation of my improved farm-gate. Figs. 2 and 3 are top views of the sector, showing it in different positions.

Similar letters of reference are used to indicate like parts throughout the several views.

A represents the gate-post, to which the gate B is hung by hinges in the usual manner.

To the upper end of the hinge-bar C of the gate B, I attach a broad plain-faced sector or segment-wheel, D, to the opposite ends of which I attach the cords, ropes, or wires E and F, which are connected with the lever-rods G and H, pivoted upon posts I and J, placed to the front and rear of the gate, and at any suitable distance from it.

In cases where this gate forms part of a continuous line of fencing, these lever-supporting posts will be set singly and near the edge of the beaten track or road in order that they may be conveniently reached and operated by a person seated upon a passing vehicle; but in cases where the gate forms a barrier or is placed across a narrow lane, the said lever-supporting posts will form a part of or serve as fence-posts for the line of fencing forming the lane; and it should here be remarked that these posts I and J should be aligned with the gate-post A, and placed at right angles to the gate when in a closed position.

The wire E is connected to the upper or short arm of the lever-arm G, and the wire F is connected to the lower or long arm of the lever H, while a wire, K, is attached to the long arm of the lever G, and connects it with the short arm of the lever H, and thus insures a reciprocating action of the levers and the segment or sector, whether the forward or rear lever-arm is operated upon to open or close the gate.

In order to provide means for operating the gate-latch, I pivot to a short standard or arm projecting from the gate-post a bell-crank lever, L, connected by a cord or wire, M, with the rear end of the latch. Wires or cords O and P, Q and R, secured to the opposite arms of the bell-crank lever L, are connected to the corresponding arms of the bell-crank levers S and T, attached to arms projecting from the lever-posts I and J. To the right-angled arms of these last-named bell-cranks I attach wires U and V, which are led down alongside the lever-arms, and their lower ends are provided with handles or knobs. The wires are passed through clips or guides W, secured upon the lever-rods, and are thus kept in position.

The latch may be of any well-known kind that is adapted to be operated by a pull-cord, and in operating the gate the traveler grasps the lever-rod and at the same time draws down the latch-wire, thus lifting the latch from its retaining-notch in the latch-post. (Not shown in the drawings.) He then pushes the lower end of the lever-arm forward, and by means of the connecting-wires and sector swings the gate open. He then passes through the gateway, and upon reaching the other lever-arm pushes the lower end of it forward, and thus causes a reverse movement of the sector and closing of the gate.

This device may be applied to any form of swinging gate, whether it be hung by one end or pivoted upon a central post.

Having thus described my invention, what I claim, and desire to secure by Letters Patent, is—

1. A latch-opening device for farm-gates, consisting of the bell-crank lever L, connected by a wire, M, to the latch, and by wires O, P, Q, and R to the bell-crank levers S and T, suitably pivoted and operated by a pull cord or wire, substantially as shown, and for the purpose set forth.

2. The combination, with the gate B, having a sector, D, attached thereto, of the posts A J I, bell-crank levers L S T, pivoted to said posts, the lever-rods G H, pivoted to the posts J I and connected by a wire, K, said lever-rods being provided with guides W, the pull-cords U V, attached to the bell-cranks S T and passed through the guides on said lever-rods, the wire M, for connecting the bell-crank L, with the gate-latch, the wires E F, by which the sector is connected to the lever-rods, and the wires O P Q R, for connecting the bell-cranks, all substantially as shown and described.

In testimony that I claim the foregoing I have hereunto set my hand and seal.

SOLOMON Q. BARLOW. [L. S.]

Witnesses:
C. W. M. SMITH,
CHAS. E. KELLY.